Aug. 7, 1928.

H. W. JEWELL 1,679,427

UNDERGROUND CONDUIT

Filed April 1, 1926

INVENTOR
H. W. Jewell
BY
ATTORNEY

Patented Aug. 7, 1928.

1,679,427

UNITED STATES PATENT OFFICE.

HOWARD W. JEWELL, OF LOS ANGELES, CALIFORNIA, ASSIGNOR TO AMERICAN TELEPHONE AND TELEGRAPH COMPANY, A CORPORATION OF NEW YORK.

UNDERGROUND CONDUIT.

Application filed April 1, 1926. Serial No. 99,120.

This invention relates to means for adjusting the meeting edges of the multiple rectangular, circular or other shaped grooves or channels which are formed longitudinally in sections of underground conduit.

Obstructions are encountered in the laying of conduits in trenches, such as foreign pipes and the like, which extend across the paths of the conduits and interfere with the continuous passage of said conduits. As the line of a multiple duct conduit cannot readily be changed in order to go around every obstruction that may be met, particularly on account of the size of the conduit and also the increased cost of laying the same, the usefulness of such conduits has been somewhat impaired.

Accordingly, it is an object of this invention to obviate this difficulty by providing means for so adjusting the meeting edges of conduit sections to permit the construction of a line of conduit in such manner that the longitudinal alinement, smoothness and continuity of connecting channels of a plurality of sections are maintained.

Other and further objects will be apparent from the following description, when considered in connection with the accompanying drawing, in which one embodiment of the invention is illustrated.

Figure 1:
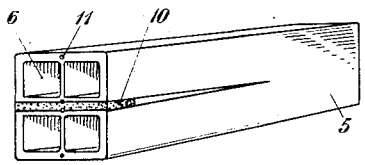
Figure 4:
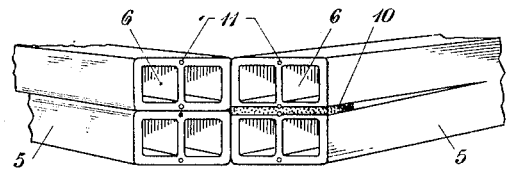
Figure 2:
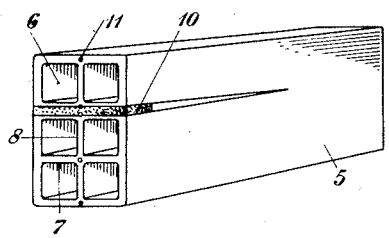
Figure 5:
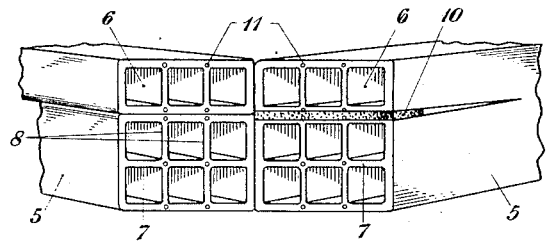
Figure 3:
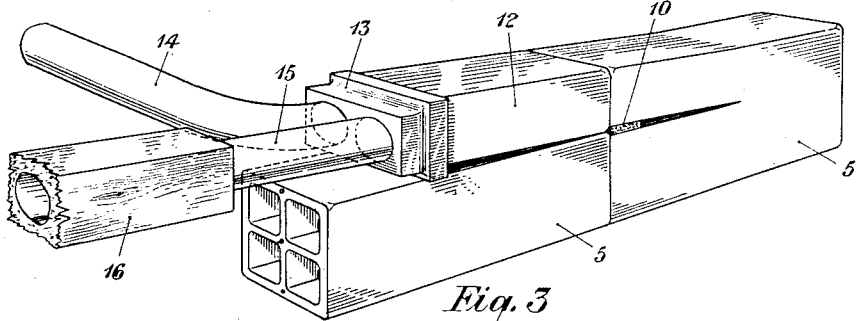
Figure 6:
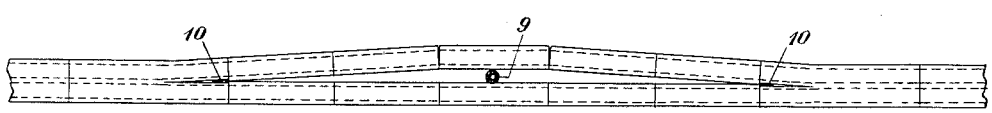

In the drawing, in which like characters of reference designate like parts throughout, Figures 1 and 2 are perspective views of conduits of different channel multiples, showing the improved arrangement applied thereto; Fig. 3 is a perspective view illustrating the application of the improved arrangement to a subsidiary conduit extending laterally from the main conduit line; Figs. 4 and 5 are perspective views indicating some combinations of conduit section multiples which may be joined to each other by means of the improved arrangements; and Fig. 6 is a view showing a conduit line with the improved arrangement applied thereto.

Referring to the drawing, the numeral 5 represents conduit sections having ducts or channels 6 extending longitudinally therein. In Fig. 1 the conduit is provided with four ducts and in Fig. 2 with six ducts. The ducts in the present instance are indicated as of rectangular form, and horizontally extending webs 7 separate the vertically alined ducts, while vertically extending webs 8 intersect the webs 7 and separate the horizontally alined ducts. These webs extend the entire distance of each section, and provide walls or partitions between the ducts throughout.

In laying the conduit in trenches, the sections 5 are placed end to end to form a continuous line so that the meeting edges of the longitudinally extending channels or ducts in the sections, which are provided for the reception of wires, or cables, register evenly with each other. In order to pass an obstruction in the line of the conduit, such as a pipe line 9 which may lie in transverse position thereto, as shown in Fig. 6, sections of conduit embodying the principles of this invention are employed.

The conduit sections may be made from some such substance as vitrified clay which may be placed in its green state in molds or formed by dies into the desired shape by a well known process. The conduit sections embodying the present invention immediately after they leave the press, and while in their green state, have the web between the ducts carefully separated by a wire or suitable cutting tool. A wedge 10, which may be prepared from the same material as that from which the conduit section is made, is placed between the separated portions of the web and the expanded conduit section is then pressed firmly in position over the wedge and the material is dried and burned in the usual manner.

The dimension of the wedge 10 is such that it increases the thickness of the web with which it is associated so that it corresponds to the thickness of the walls of two conduit sections when placed upon one another. Thus when an obstruction such as the transversely positioned pipe is encountered, a section of the improved conduit is employed, and to the end of such conduit are applied the ends of two conduit sections placed one on the other. For instance, if the section of conduit has four ducts, as shown in Fig. 4, a combination of the two-duct sections placed one on the other will be used therewith. Should the sections be of a nine-duct type, the combination of conduit sections to be used therewith may comprise a six-duct section and a three-duct section superposed thereon as indicated in Fig. 5. Thus sections of conduit equipped with the improved arrangement and having any desired number of ducts therein may be coupled with sections of plain conduit having a corresponding number of ducts by placing two of the latter together one upon the other. When so placed the contiguous or top and bottom walls of two associated or smaller conduit sections will be in alinement with the enlarged portion of the conduit section provided with the wedge. The thickness of the two adjoining walls of the superposed conduit sections will be compensated for by the thickness of the web having the wedge portion of the adjacent conduit section. The superposed sections of conduit extend from the section of conduit provided with the wedge portion, and the upper branch slightly diverges upwardly, while the lower branch continues along the same line as the main conduit. These branches may connect with other branches of conduit sections joined to a conduit section provided with a web portion and oppositely positioned to that first mentioned, as shown in Fig. 6. The space between the parallel diverging branches may be sufficient to permit the passage of transverse pipes through the line of conduit. The meeting edges of the ducts in the line of conduit sections will coincide with each other, and a smooth and continuous surface will be provided throughout. The smooth and continuous surface of the ducts permits the drawing of cables or wires therethrough without injury to their covering.

The sections of conduit may be joined together in the usual manner, and said sections may be equipped with holes 11 for the reception of dowel pins which co-operate in keeping the sections in joined relation.

In the adaptation of the improved arrangement illustrated in Fig. 3, a six-duct conduit is provided with a wedge 10 inserted in the web separating the two upper ducts from the four lower ducts. The latter ducts may be extended by attaching conduit sections having four ducts as indicated, and the meeting edges of the sections will coincide to provide a smooth and continuous line for the ducts. The two-duct section of conduit, as shown by the character 12, may be superposed on the four-duct section of conduit. The two-duct section of conduit 12 is usually shorter in length than the four-duct conduit upon which it is positioned, and may be used where it is desired to place subsidiary ducts in the same trench with the main conduits for the purpose of making lateral connections, for instance, between manholes. A casting 13 may be attached to the end of the ducts 12 in any suitable manner, and pipes 14 and 15 may extend therefrom. For the purpose of illustration, the pipe 14 may be turned to make a connection laterally of the main line, and the pipe 15 may connect with a creosoted wood duct 16 which may extend to the next manhole. The thickness of the two contiguous walls of the four-duct conduit and the superposed two-duct conduit will be compensated for by the thickness of the web portion of the adjoining six-duct conduit section.

By means of this invention it will be apparent that the previous difficulty experienced in constructing a line of multiple duct conduits by reason of the obstacles found in a transverse line to the conduit, especially in the larger cities, will be eliminated. By the present construction a greater thickness is provided for the horizontal webs of the conduits and a combination of conduits may be coupled therewith so that sufficient space is permitted for the passage of pipes or like obstructions lying in a transverse direction to the conduit line without interrupting the continuity or smoothness of the connecting ducts, thereby rendering a multiple duct conduit available in all places regardless of the number of transverse obstructions that may be met.

While there is shown and described herein certain forms of the invention by way of illustration, it is understood that it is not limited or confined to the construction herein described and delineated, as modification and variation may be made within the scope of the claims without departing from the spirit of the invention.

What is claimed is:

1. A junction in a run of multiple duct conduit comprising a multiple duct section having a plurality of layers of ducts, and a partition wall between contiguous layers thickened at the junction end, and two separate conduit sections having ducts corresponding respectively to the layers of ducts in the multiple duct section and laid with external walls at the junction end in contact and in continuation with the thickened partition wall of the multiple duct section, the said thickened partition wall being substantially of the same thickness as the combined thickness of the said external walls.

2. A junction in a run of multiple duct conduit comprising a multiple duct section having a plurality of layers of ducts, and a partition wall between contiguous layers thickened at the junction end, and two separate conduit sections having ducts corresponding respectively to the layers of ducts in the multiple duct section and laid with external walls at the junction end in contact and in continuation with the thickened partition wall of the multiple duct section, the said thickened partition wall being substantially of the same thickness as the combined thickness of the said external walls to permit passage of obstructions extending in a transverse position to the run of the multiple duct conduit without interfering with the continuity thereof.

In testimony whereof, I have signed my name to this specification this 19th day of March, 1926.

HOWARD W. JEWELL.